United States Patent
Sakai et al.

(10) Patent No.: US 9,391,341 B2
(45) Date of Patent: Jul. 12, 2016

(54) MANUFACTURING METHOD FOR MOLTEN SALT BATTERY AND MOLTEN SALT BATTERY

(75) Inventors: Shoichiro Sakai, Osaka (JP); Atsushi Fukunaga, Osaka (JP); Koji Nitta, Osaka (JP); Shinji Inazawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 259 days.

(21) Appl. No.: 14/128,510

(22) PCT Filed: Jun. 29, 2012

(86) PCT No.: PCT/JP2012/066659
§ 371 (c)(1),
(2), (4) Date: Dec. 20, 2013

(87) PCT Pub. No.: WO2013/002359
PCT Pub. Date: Jan. 3, 2013

(65) Prior Publication Data
US 2014/0093757 A1 Apr. 3, 2014

(30) Foreign Application Priority Data
Jun. 29, 2011 (JP) ................................. 2011-144260

(51) Int. Cl.
*H01M 10/04* (2006.01)
*H01M 10/39* (2006.01)
(Continued)

(52) U.S. Cl.
CPC ............ *H01M 10/04* (2013.01); *H01M 2/1235* (2013.01); *H01M 2/362* (2013.01); *H01M 2/365* (2013.01); *H01M 10/049* (2013.01);
(Continued)

(58) Field of Classification Search
CPC ... H01M 2/1235; H01M 2/362; H01M 2/365; H01M 10/049; H01M 10/0413; H01M 10/04; H01M 10/3909; H01M 10/399; H01M 2300/0048; Y10T 29/4911
See application file for complete search history.

(56) References Cited

U.S. PATENT DOCUMENTS

| | | | |
|---|---|---|---|
| 2004/0233537 A1* | 11/2004 | Agrawal | B60R 1/088 359/604 |
| 2009/0123845 A1 | 5/2009 | Zaghib et al. | |
| 2009/0212743 A1 | 8/2009 | Hagiwara et al. | |

FOREIGN PATENT DOCUMENTS

| | | |
|---|---|---|
| CN | 201789002 U | 4/2011 |
| JP | 10-270076 A | 10/1998 |

(Continued)

OTHER PUBLICATIONS

English translation of JP Publication 2009-043535, Feb. 2009.*
(Continued)

*Primary Examiner* — Brittany Raymond
(74) *Attorney, Agent, or Firm* — Ditthavong & Steiner, P.C.

(57) ABSTRACT

Provided is a method for manufacturing a molten salt battery. The method includes a housing step (S100) for housing a positive electrode, a negative electrode and a separator in a battery container; an injecting step (S110) for injecting the molten salt into the battery container while heating the battery container; a closing step (S120) for closing the battery container with a closing lid; a heating and drying step (S130) for heating the battery container in a vacuum state with a check valve open; and a sealing step (S150) for closing the check valve. In summary, the positive electrode, negative electrode, separator and molten salt are heated and dried in a vacuum state.

10 Claims, 3 Drawing Sheets

(51) Int. Cl.
*H01M 2/12* (2006.01)
*H01M 2/36* (2006.01)

(52) U.S. Cl.
CPC ...... *H01M10/0413* (2013.01); *H01M 10/3909* (2013.01); *H01M 10/399* (2013.01); *H01M 2300/0048* (2013.01); *Y10T 29/4911* (2015.01)

(56) References Cited

FOREIGN PATENT DOCUMENTS

| | | | |
|---|---|---|---|
| JP | 2000-188114 A | | 7/2000 |
| JP | 2004-303642 A | | 10/2004 |
| JP | 2009-043535 | * | 2/2009 |
| JP | 2009-043535 A | | 2/2009 |
| JP | 2009-506505 A | | 2/2009 |
| JP | 2009-067644 A | | 4/2009 |
| JP | 2010-062163 | * | 3/2010 |
| JP | 2010-062163 A | | 3/2010 |
| JP | 2011-119201 A | | 6/2011 |
| WO | 2006/101141 A1 | | 9/2006 |
| WO | 2007/025361 A1 | | 3/2007 |
| WO | 2012/073653 A1 | | 6/2012 |

OTHER PUBLICATIONS

English translation of JP Publication 2010-062163, Mar. 2010.*
International Search Report for corresponding Application No. PCT/JP2012/066659, dated Aug. 7, 2012, 2 pages.
International Preliminary Report on Patentability for International Application No. PCT/JP2012/066659, dated Jan. 7, 2014, 7 pages.
Chinese Office Action for related Chinese Patent Application No. 201280031832.9 dated Jul. 3, 2015, 15 Pages.

* cited by examiner

MANUFACTURING METHOD FOR MOLTEN SALT BATTERY AND MOLTEN SALT BATTERY

FIELD OF THE INVENTION

The present invention relates to a method for producing a molten salt battery, and also to a molten salt battery.

BACKGROUND OF THE INVENTION

Molten salt batteries are produced using methods that are the same as those used for other non-aqueous electrolyte secondary batteries. Patent Document 1 discloses a method for producing a non-aqueous electrolyte secondary battery by using an organic electrolyte liquid as an electrolyte. In this production method, a battery container that houses a positive electrode and a negative electrode is first placed in a chamber. Next, the chamber is subjected to a vacuum and heating so as to dry the battery container and remove moisture. The chamber is then returned to normal pressure and an organic electrolyte liquid is injected into the battery container.

In this case, moisture is removed from the organic electrolyte liquid at the organic electrolyte liquid production stage. However, the organic solvent used in the organic electrolyte liquid has physical properties, such as boiling point, that are similar to those of water. Therefore, removing water from an organic electrolyte liquid requires a refining step, such as precision distillation, as disclosed in Patent Document 2 for example. Moreover, if moisture is present in a secondary battery, resistance increases and charging and discharging capacity decreases due to hydrolysis of the electrolyte. In addition, long term use of secondary batteries leads to concerns regarding battery deterioration. Therefore, moisture removal treatment is carried out in non-aqueous electrolyte secondary battery production processes.

However, when producing molten salt batteries also, it is possible to remove moisture when producing a molten salt that forms an electrolyte. However, molten salts are polar hygroscopic substances. Therefore, when storing or transporting molten salts following production or when producing batteries, there are concerns that molten salts will be affected by atmosphere and tools and absorb moisture. As a result, it is possible to use the production methods disclosed in the above-mentioned documents for molten salt batteries, but it is not possible to achieve reliability that is similar to, or greater than, that of conventional secondary batteries. That is, there are concerns that the performance of secondary batteries will deteriorate over long periods of time as a result of water being contained in molten salts.

PRIOR ART DOCUMENT

Patent Document

Patent Document 1: Japanese Patent Application Publication No. 2000-188114
Patent Document 2: Japanese Patent Application Publication No. H10-270076

SUMMARY OF THE INVENTION

An objective of the present invention is to provide a method for producing a molten salt battery having a low water content and to provide a molten salt battery able to be used for a long period of time.

In order to achieve the above-mentioned objective, a first mode of the present invention provides a method for producing a molten salt battery. The method for producing a molten salt battery has: a housing step of housing a positive electrode, a negative electrode and a separator in a battery container; an injecting step of injecting a molten salt into the battery container; a closing step of closing the battery container with a closing lid provided with a gas discharge port; a heating and drying step of housing the battery container in a chamber, with the gas discharge port open, and heating the battery container under vacuum in the chamber; and a sealing step of closing the gas discharge port.

According to this constitution, the battery container is housed in a chamber with the gas discharge port open and the battery container is heated under vacuum in the chamber. By removing water present in the molten salt, positive electrode, negative electrode and separator in this way, it is possible to reduce the water content in the molten salt battery.

In the above-mentioned method for producing a molten salt battery, it is preferable to include a heating and partial charging step before carrying out the heating and drying step in which the battery container is heated.

According to this constitution, by including the heating and partial charging step, it is possible to significantly reduce the moisture content in the battery in the final sealing step in which the gas discharge port is closed. Moreover, in the heating and partial charging step, charging is carried out to approximately 10 to 50% of the battery capacity while the molten salt is being heated. This operation is called partial charging because the charging depth is approximately 10 to 50%, not 100%.

In the above-mentioned method for producing a molten salt battery, the molten salt contains an anion represented by $N(SO_2-R1)(SO_2-R2)$ (R1 and R2 are each independently a fluorine atom or a fluoroalkyl group) and a cation of at least one of an alkali metal and an alkaline earth metal, and in the heating and drying step, the molten salt is preferably heated to a temperature that is not lower than the melting point of the molten salt and not higher than the temperature at which the molten salt decomposes.

According to this constitution, because the molten salt is heated in a liquid state, it is possible to effectively remove water contained in the molten salt. In addition, because the heating temperature is not higher than the temperature at which the molten salt decomposes, it is possible to suppress decomposition of the molten salt in the heating and drying step. Moreover, in the heating and drying step, it is possible to simultaneously remove moisture present in the positive electrode, the negative electrode and the separator in addition to moisture present in the molten salt.

In the above-mentioned method for producing a molten salt battery, the molten salt preferably contains an anion represented by $N(SO_2-R1)(SO_2-R2)$ (R1 and R2 are each independently a fluorine atom or a fluoroalkyl group) and, as cations, a sodium ion and at least one type of cation selected from among a quaternary ammonium ion, an imidazolium ion, an imidazolinium ion, a pyridinium ion, a pyrrolidinium ion, a piperidinium ion, a morpholinium ion, a phosphonium ion, a piperazinium ion and a sulfonium ion.

By using a sodium ion and at least one type of cation selected from among a quaternary ammonium ion, an imidazolium ion, an imidazolinium ion, a pyridinium ion, a pyrrolidinium ion, a piperidinium ion, a morpholinium ion, a phosphonium ion, a piperazinium ion and a sulfonium ion as cations, it is possible to provide to reduce the melting point of the molten salt to lower than that of a molten salt containing only alkali metals and alkaline earth metals as cations and also possible to provide a molten salt battery electrolyte that is easier to handle in terms of electrolyte viscosity and ionic conductivity.

In the above-mentioned method for producing a molten salt battery, it is preferable to charge the battery container with an inert gas via the gas discharge port after the heating and drying step.

In cases where the pressure inside the battery container is maintained at a vacuum, it is essential to increase the strength of the battery container in order to prevent deformation of the battery container due to atmospheric pressure. According to the present invention, by charging the battery container with an inert gas, it is possible for the pressure inside the battery container to be a higher pressure than a vacuum. Therefore, it is possible to somewhat reduce the strength of the battery container. Moreover, charging the battery container with an inert gas is not an essential condition, and charging with an inert gas may be omitted in some cases. In addition, it is possible to use argon gas, nitrogen gas or dry air as the inert gas.

In the above-mentioned method for producing a molten salt battery, the water content in the inert gas is preferably 10 ppm or lower.

According to this constitution, it is possible to suppress an increase in water content inside the battery container by charging with an inert gas.

In the above-mentioned method for producing a molten salt battery, the water content inside the battery container is preferably 200 ppm or lower.

In the above-mentioned method for producing a molten salt battery, the water content in the molten salt inside the battery container is preferably 200 ppm or lower.

If the water content in the molten salt inside the battery container exceeds 200 ppm, the capacity of the molten salt battery may decrease if the battery is used for a long period of time. Meanwhile, if the water content is 200 ppm or lower, the degree of reduction in battery capacity after long-term use is reduced. This is thought to be caused by oxides or hydroxides adhering to the surface of electrodes due to water or caused by deterioration in the molten salt due to a reaction with water. According to the present invention, because the water content in the molten salt inside the battery container is 200 ppm or lower, it is possible to suppress a decrease in the capacity of the molten salt battery after long-term use.

In the above-mentioned method for producing a molten salt battery, it is preferable for the closing lid to be provided with a check valve having a vent hole as a gas discharge port.

According to this constitution, by having a check valve, it is possible to prevent the pressure inside the molten salt battery from becoming excessively high. In addition, it is possible to remove moisture present inside the battery container via the check valve.

In the above-mentioned method for producing a molten salt battery, it is preferable for the closing lid to be provided with an outlet as a gas discharge port and a gas exhaust pipe having a closable pipeline.

According to this constitution, it is possible to remove moisture present inside the battery container via the gas pipeline.

In order to achieve the above-mentioned objective, a second mode of the present invention provides a molten salt battery produced using the above-mentioned method for producing a molten salt battery.

According to the above-mentioned method for producing a molten salt battery, it is possible to reduce the water content inside the molten salt battery by removing moisture present in the molten salt. Therefore, the molten salt battery can be used in applications in which charging and discharging are repeated over a long period of time, such as industrial storage batteries or storage batteries used in combination with solar cells. In addition, the method for producing a molten salt battery and molten salt battery of the present invention can also be used for batteries that use metal outer packaging cans or for metal laminate type batteries.

DETAILED DESCRIPTION OF THE PREFERRED EMBODIMENTS

One embodiment, in which the molten salt battery of the present invention is embodied as a sodium molten salt battery, will now be explained with reference to FIGS. 1 to 3.

Figure 1:
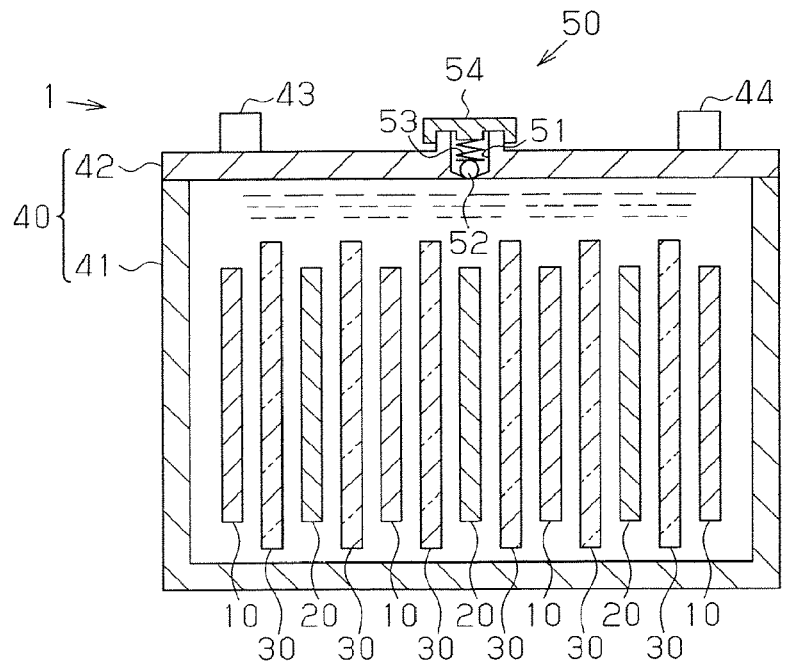
FIG. 1 is a cross sectional diagram of a molten salt battery according to one embodiment of the present invention.

As shown in FIG. 1, a molten salt battery 1 is provided with a positive electrode 10, a negative electrode 20, a separator 30 disposed between the positive electrode 10 and the negative electrode 20, and a battery container 40 that houses the positive electrode 10, the negative electrode 20 and the separator 30. A molten salt that forms an electrolyte is charged in the battery container 40.

The battery container 40 is provided with a container body 41 and a closing lid 42 that closes the container body 41. The container body 41 houses a laminated body comprising the positive electrode 10, the negative electrode 20 and the separator 30. The closing lid 42 is provided with a positive electrode terminal 43 and a negative electrode terminal 44. The positive electrode terminal 43 is electrically connected to the positive electrode 10. The negative electrode terminal 44 is electrically connected to the negative electrode 20. The closing lid 42 is provided with a check valve 50 for allowing gas generated inside the molten salt battery 1 to escape. The check valve 50 is provided with a vent hole 51, which penetrates through the closing lid 42, a ball 52, which closes the vent hole 51, a coiled spring 53, and a securing pin 54, which secures the coiled spring 53 in a compressed state.

The internal diameter of the vent hole 51 is constant from the upper edge to the vicinity of the center of the vent hole 51 and then decreases from the vicinity of the center towards the lower edge of the vent hole 51. A valve seat that holds the ball 52 is formed on the inner surface of the closing lid 42. The vent hole 51 houses the ball 52 and the coiled spring 53, which pushes the ball 52 towards the inside of the battery container 40. The ball 52 is pushed by the securing pin 54 via the coiled spring 53. The compressive force applied by the securing pin 54 is set to be between $0.2 \times 10^5$ Pa and $0.3 \times 10^5$ Pa.

The positive electrode 10 comprises a current collector, a positive electrode active substance, a binder and an auxiliary conductive agent. The current collector collects electrons generated by an oxidation-reduction reaction in the positive electrode active substance. The positive electrode active substance and the auxiliary conductive agent are bonded to the current collector via the binder. Electrons and positive holes generated in the positive electrode active substance are transported to the current collector via the auxiliary conductive agent.

An aluminum non-woven fabric can be used as the current collector. The aluminum non-woven fabric is an assembly of fine aluminum wires. A thin film of aluminum oxide is formed on the surface of the fine aluminum wires. An aluminum non-woven fabric having an overall thickness of 100 to 200 μm and a porosity of 70 to 90% can be used as the current collector.

An oxide that absorbs and releases sodium ions, such as $NaCrO_2$, can be used as the positive electrode active substance. A carbonaceous electrically conductive substance that does not undergo electrolysis, such as acetylene black, can be used as the auxiliary conductive agent. A substance that is inert to the electrolyte liquid and bonds to aluminum and the like, such as poly(vinylidene fluoride), can be used as the binder.

A salt that contains an anion represented by $N(SO_2R1)(SO_2R2)$ (wherein R1 and R2 are F) (hereinafter referred to as "FSA"), a sodium cation and a potassium cation (hereinafter referred to as "NaFSA-KFSA", and specifically a salt in which the NaFSA-KFSA molar ratio is 56:44, can be used as the molten salt.

In addition to NaFSA-KFSA, it is possible to use, for example, an anion compound in which one or both of R1 and R2 in the $N(SO_2R1)(SO_2R2)$ are substituted with a fluoroalkyl group instead of the FSA in the NaFSA-KFSA as the molten salt.

For example, it is possible to use an anion (herein after referred to as TFSA) in which R1 and R2 in the $N(SO_2R1)(SO_2R2)$ are $CF_3$ groups. LiTFSA, NaTFSA, KTFSA, RbTFSA, CsTFSA, $Mg(TFSA)_2$, $Ca(TFSA)_2$, $Sr(TFSA)_2$ or $Ba(TFSA)_2$ can be used as a single molten salt having TFSA as an anion. It is also possible to use a mixture of these compounds as the molten salt. In addition, it is possible to use an alkali metal such as Li, K, Rb or Cs cation or an alkaline earth metal such as Mg, Ca, Sr or Ba cation instead of Na or K in the NaFSA-KFSA. For example, it is possible to use LiFSA, NaFSA, KFSA, RbFSA, CsFSA, $Mg(FSA)_2$, $Ca(FSA)_2$, $Sr(FSA)_2$ or $Ba(FSA)_2$ as the molten salt. In addition, it is also possible to use a mixture of these compounds as the molten salt.

In addition, it is possible to use a molten salt that contains an anion represented by $N(SO_2—R1)(SO_2—R2)$ (R1 and R2 are each independently a fluorine atom or a fluoroalkyl group) and, as cations, a sodium ion and at least one type of cation selected from among a quaternary ammonium ion, an imidazolium ion, an imidazolinium ion, a pyridinium ion, a pyrrolidinium ion, a piperidinium ion, a morpholinium ion, a phosphonium ion, a piperazinium ion and a sulfonium ion, which are organic cations, as a molten salt that enables a molten salt battery to operate at lower temperatures. By changing the types and quantities of anions and cations in these molten salts, it is possible to obtain molten salts that can be used at a variety of temperatures.

By selecting two or more of the above-mentioned molten salts and adjusting the proportions of the molten salts, it is possible to achieve a eutectic temperature of 100° C. or lower. In addition, these molten salts are all non-volatile under vacuum conditions (10 Pa or higher).

A Sn—Na alloy can be used as the negative electrode 20. The core part of the negative electrode 20 is Sn, and the surface of the negative electrode 20 is a Sn—Na alloy. The Sn—Na alloy is formed by depositing Na on metallic Sn by plating. It is possible to use a material capable of a reversible charging and discharging reaction of Na ions, such as hard carbon or a sodium-titanium oxide, instead of a Sn—Na alloy in the negative electrode 20.

The separator 30 is disposed so that the positive electrode 10 and the negative electrode 20 do not come into contact with each other. However, the separator 30 allows the passage of sodium ions via the molten salt electrolyte. In this case, the molten salt comes into contact with the positive electrode 10 and the negative electrode 20. A glass cloth having a thickness of 200 μm can be used as the separator 30. In addition to a glass cloth, a ceramic material such as alumina or zirconia or an organic material such as a polyolefin or PTFE (poly(tetrafluoroethylene)) can be used as the separator 30, depending on the usage conditions of the molten salt battery.

A method for producing the molten salt battery 1 will now be explained with reference to the flow chart shown in FIG. 2.

First, a slurry is prepared by mixing $NaCrO_2$ as a positive electrode active substance, acetylene black as an auxiliary conductive agent, poly(vinylidene fluoride) as a binder and N-methyl-2-pyrrolidone as a solvent at a mass ratio of 85:10:5:50. Next, the slurry is coated on a current collector comprising an aluminum non-woven fabric. Furthermore, the coated body obtained by coating the slurry on the aluminum non-woven fabric is placed in a heating device and dried. After being dried, the coated body is pressed at a prescribed pressure. The positive electrode 10 is formed in this way.

Next, the molten salt battery 1 is assembled. Specifically, a laminated body comprising the positive electrode 10, the negative electrode 20 and the separator 30 are housed in the container body 41, as shown in FIG. 2 (housing step: S100). Next, the container body 41 is held at a temperature of 100° C. and the molten salt is injected into the container body 41 (injecting step: S110). The container body 41 is then cooled to room temperature (25° C.). The closing lid 42 is then attached to the container body 41, and these are welded together by means of a laser (closing step: S120). The battery container 40 is completed in this way.

Moisture inside the battery container 40 is then removed (heating and drying step: S130). Specifically, with the check valve 50 in the closing lid 42 open, the battery container 40 is placed inside a chamber 110. The pressure inside the chamber 110 is reduced by means of a vacuum pump 120, and the battery container 40 is heated by means of a heater and maintained at a temperature of approximately 100° C. Once the pressure inside the chamber 110 reaches 100 Pa or lower, a temperature of 100° C. and a pressure of 100 Pa or lower are maintained for a period of 1 hour or longer. By doing so, the moisture content inside the battery container 40 reaches 200 ppm or lower.

Next, while cooling the battery container 40, argon gas having a water content of 10 ppm or lower is injected into the chamber 110. Until the pressure inside the chamber 110 and the battery container 40 reaches the prescribed pressure of $0.8 \times 10^5$ Pa to $1.0 \times 10^5$ Pa, argon gas is charged into the chamber 110 (gas charging step: S140). Once the pressure inside the battery container 40 reaches the prescribed pressure, the securing pin 54 is pushed inside the vent hole 51 and the closing lid 42 is secured. In this way, the check valve 50 is closed and the battery container 40 is sealed (sealing step: S150).

The heating and drying device 100 will now be explained with reference to FIG. 3.

Figure 3:
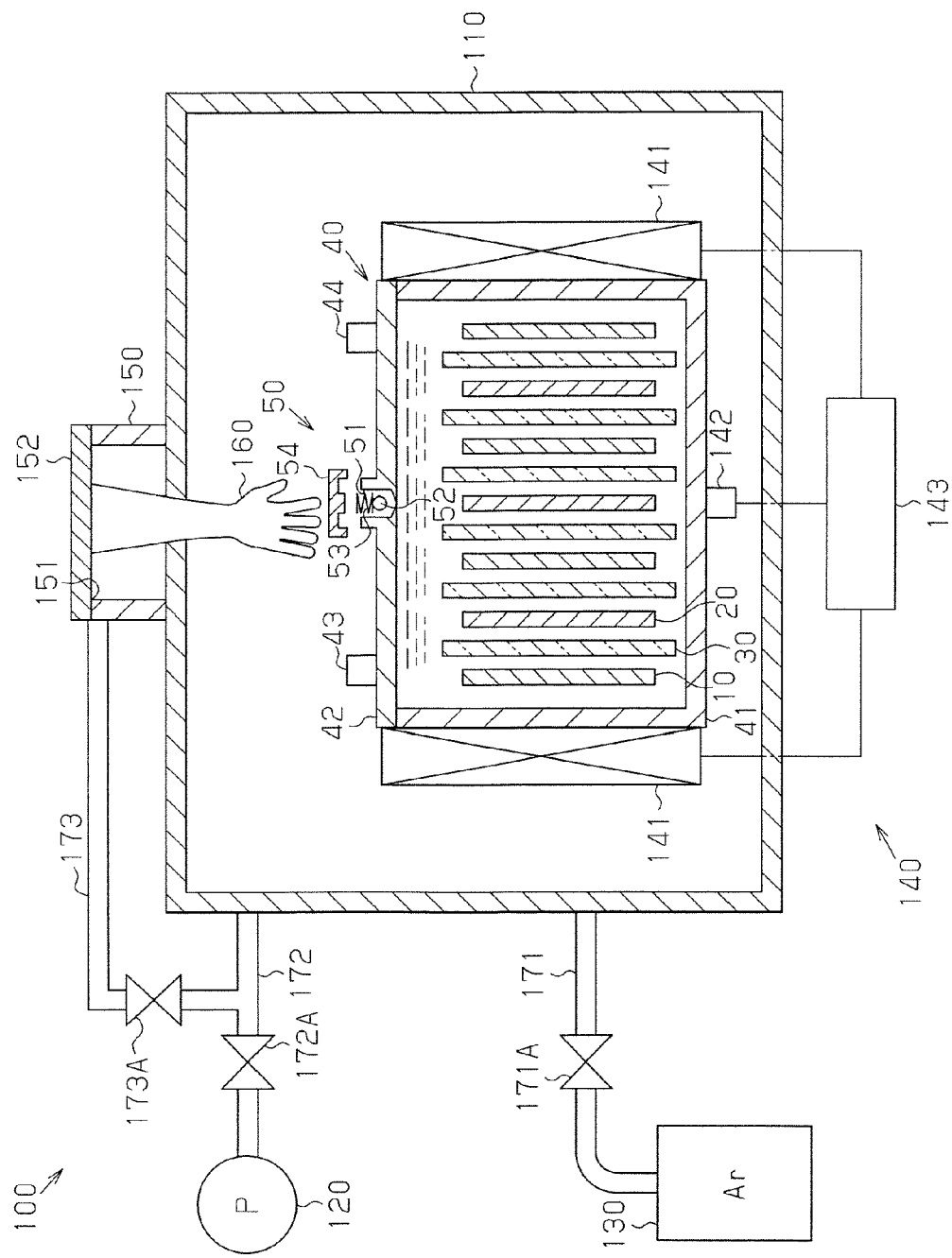
FIG. 3 is a schematic diagram showing a heating and drying device used for a molten salt battery.

As shown in FIG. 3, the heating and drying device 100 comprises the chamber 110, the vacuum pump 120 that creates a vacuum inside the chamber 110, an argon cylinder 130 that injects argon gas into the chamber 110, a heating device 140 that heats the battery container 40, a glove-fitted box 150, and a glove 160.

The chamber 110 has sufficient strength to withstand a vacuum of 1.0 Pa. The argon cylinder 130 supplies the chamber 110 with argon gas having a water content of 10 ppm or lower and a purity of 99.99%. The argon cylinder 130 and the chamber 110 are connected to each other via a first connecting tube 171. The first connecting tube 171 is provided with a first on-off valve 171A.

The heating device 140 is provided with a heater 141, a temperature sensor 142 that measures the temperature of the battery container 40, and a temperature control device 143 that controls the preset temperature of the heater 141. The temperature control device 143 controls the temperature of the battery container 40 to a target temperature on the basis of output values from the temperature sensor 142 and the preset temperature of the heater 141. The target temperature corresponds to the heating temperature of the battery container 40.

The glove 160 is formed from natural rubber. The glove 160 is attached inside the glove-fitted box 150. An opening part 151 that allows a hand to pass into the glove 160 is provided inside the glove-fitted box 150. The opening part 151 is provided with a lid 152 for closing the opening part 151. When creating a vacuum in the chamber 110, the opening part 151 is closed by means of the lid 152.

The vacuum pump 120 and the chamber 110 are connected to each other via a second connecting tube 172. The second connecting tube 172 is connected to a third connecting tube 173. One end of the third connecting tube 173 is connected to the second connecting tube 172, which connects the vacuum pump 120 to the chamber 110. The other end of the third connecting tube 173 is connected to the glove-fitted box 150. Hereinafter, the point at which the second connecting tube 172 meets the third connecting tube 173 is referred to as the branched part. The second connecting tube 172, which connects the vacuum pump 120 to the branched part, is provided with a second on-off valve 172A. The third connecting tube 173 is provided with a third on-off valve 173A.

The procedure for the heating and drying step of the molten salt battery 1 will now be explained with reference to FIG. 3.

As shown in FIG. 3, the battery container 40, into which the molten salt has been injected, is housed inside the chamber 110. Here, the check valve 50 is opened so as to connect the inner side and outer side of the battery container 40. Next, the heater 141 is pushed against the wall of the battery container 40 and heats the battery container 40. Furthermore, the vacuum pump 120 is started when the heating starts, and the second on-off valve 172A and the third on-off valve 173A are opened. Once the battery container 40 reaches a temperature of 100° C. and the pressure inside the chamber 110 reaches 100 Pa, this heated vacuum state is maintained for a period of 1 hour or longer. The period for which this heated vacuum state is maintained is altered as appropriate according to the size of the molten salt battery 1, the heating temperature, and so on.

Here, the third on-off valve 173A is opened in order to remove air from inside the glove-fitted box 150. This is in order to prevent a large difference in pressure between the inner part and outer part of the glove 160 and prevent the glove 160 from rupturing.

Once the prescribed period of time has passed, the first on-off valve 171A is opened and argon gas is charged in the chamber 110. The chamber 110 is charged with argon gas until the pressure inside the chamber 110 reaches $1.0 \times 10^5$ Pa. Next, the preset temperature of the heater 141 is gradually lowered and the battery container 40 is allowed to cool to room temperature (25° C.). By carrying out the above-mentioned step, the gas inside the battery container 40 and the molten salt is replaced by argon gas.

Once the battery container 40 has cooled to room temperature, the check valve 50 is closed using the glove 160. Specifically, the lid 152 of the glove-fitted box 150 is opened, a hand is inserted into the glove 160, and the securing pin 54 is turned by the hand. In this way, the securing pin 54 is pushed into the closing lid 42 and the closing lid 42 is secured. By carrying out the above mentioned procedure, the assembly of the molten salt battery 1 is complete.

In conventional production methods, the positive electrode 10, the negative electrode 20 and the separator 30 were heated and dried, these were then attached to the battery container 40, and the molten salt was then injected. As a result, it was not possible to remove moisture contained in the molten salt. According to the present embodiment, however, the entire battery container 40, into which the molten salt has been injected, is subjected to heat and vacuum, and this heated vacuum state is maintained for a prescribed period of time. In this way, the molten salt is dried under vacuum. Here, the molten salt has a low vapor pressure, and therefore hardly evaporates even when subjected to a temperature of 100° C. and drying under vacuum. As a result, it is possible to remove moisture contained in the molten salt by using the above-mentioned method.

Therefore, according to the present embodiment, it is possible to achieve the following effects.

(1) First, with the check valve 50 open, the battery container 40 is housed in the chamber 110. Next, a vacuum is created in the chamber 110 and the battery container 40 is heated. In this way, the positive electrode 10, the negative electrode 20, the separator 30 and the molten salt can be simultaneously heated and dried. As a result, it is possible to reduce the water content in the molten salt battery 1 without increasing the number of production steps.

(2) In the above-mentioned heating and drying step, the molten salt is heated at a temperature that is not lower than the melting point of the molten salt and not higher than the temperature at which the molten salt decomposes. Specifically, once the pressure inside the chamber 110 reaches 100 Pa or lower, a temperature of 100° C. and a pressure of 100 Pa or lower are maintained for a period of 1 hour or longer. By using these conditions, the molten salt is heated in a liquid state, and it is therefore possible to effectively remove water contained in the molten salt. In addition, because the heating temperature is not higher than the temperature at which the molten salt decomposes, it is possible to suppress decomposition of the molten salt.

(3) In cases where the pressure inside the battery container 40 is maintained at a vacuum, it is essential to increase the strength of the battery container 40 in order to prevent deformation of the battery container 40 due to atmospheric pressure. According to the present embodiment, once the battery container 40 has been heated and dried, the battery container 40 is charged with argon gas. As a result, the pressure inside the battery container 40 is higher than the pressure during the vacuum state due to the presence of the argon gas. Therefore, it is possible to somewhat reduce the strength of the battery container 40.

(4) Argon gas having a water content of 10 ppm or lower can be used as the gas charged in the battery container 40. As a result, it is possible to suppress an increase in the water content inside the battery container 40 by charging with argon gas.

(5) If the water content in the molten salt inside the battery container exceeds 200 ppm, there are concerns that the capacity of the molten salt battery may decrease if the battery is used for a long period of time. This is thought to be caused by oxides or hydroxides adhering to the surface of an electrode due to water or caused by deterioration in the molten salt due to a reaction with water. In particular, in cases where the molten salt contains fluorine, there are concerns that hydrofluoric acid (HF) will be generated by a reaction between the molten salt and water when the battery is operated in an environment at approximately 100° C. In such cases, the hydrofluoric acid can corrode the battery container and the electrode members, which leads to problems relating to stability of battery performance. According to the present embodiment, the water content inside the battery container 40 is suppressed to 200 ppm or lower. As a result, it is possible to suppress a reduction in the capacity of the molten salt battery 1 caused by long-term use compared to a case in which the water content inside of the battery container 40 is not reduced to 200 ppm or lower by drying.

(6) The battery container 40 is provided with a check valve 50, which is provided with a vent hole 51 as an argon gas discharge port. According to this constitution, it is possible to remove moisture from inside the battery container 40 by means of the check valve 50. In addition, the pressure inside the battery container 40 can increase as a result of the molten salt battery 1 being used. In such cases, it is possible to discharge gas inside the battery container 10 by means of the check valve 50, thereby improving the safety of the molten salt battery.

(7) NaFSA-KFSA (56 mol %:44 mol %) can be used as the molten salt. In addition, in the heating and drying step, the molten salt is heated to a temperature that is not lower than the melting point of the molten salt (180° C. or lower (for example, 100° C.)), subjected to a vacuum, and then held in this state for a period of 1 hour or longer. In this case, because the decomposition temperature of the NaFSA-KFSA is 190° C., it is possible to remove moisture from the molten salt without decomposing the molten salt by using the above-mentioned production conditions. In addition, it is possible to reduce the water content in the molten salt battery 1 to a level below that in a case where heating and drying is carried out for a period of less than 1 hour.

(8) The molten salt battery 1 produced using the above-mentioned production method has a low water content, and can therefore be used for a long period of time. Therefore, the molten salt battery can be used in applications in which charging and discharging are repeated over a long period of time, such as industrial storage batteries or storage batteries used in combination with solar cells.

Moreover, the present embodiment may be altered as follows.

In the above-mentioned embodiment, the positive electrode 10, the negative electrode 20 and the separator 30 are housed in the battery container 40, the molten salt is injected into the battery container 40 and the battery container 40 is then subjected to a vacuum and heated and dried, but it is also possible to heat and dry the positive electrode 10, the negative electrode 20 and the separator 30 before being housed in the battery container 40. In this way, it is possible to shorten the heating and drying period in the vacuum state.

In the above-mentioned embodiment, the battery container 40 is charged with argon, and the battery container 40 is sealed by closing the check valve 50. Moreover, the check valve 50 is closed by inserting a hand into the glove 160, which is attached to the heating and drying device 100, and turning the securing pin 54 by means of the hand, thereby closing the check valve 50. However, this operation is not efficient, and may be altered as follows. Specifically, it is possible to provide the heating and drying device 100 with a tool that rotates the securing pin 54 of the check valve 50. The tool is constituted so that the tip of the tool can be rotated from outside the heating and drying device 100. In this case, the space between the rotating part of the tool and the tool mounting part of the heating and drying device 100 is constituted so as to be air-tight. When rotating the securing pin 54, the tip of the tool catches and rotates the securing pin 54. According to this constitution, it is not necessary to rotate the check valve 50 by hand, and the assembly procedure of the molten salt battery 1 can be carried out efficiently.

In the above-mentioned embodiment, the molten salt in the molten salt battery 1 was a compound containing FSA or TFSA, but it is possible to obtain a molten salt battery in which the electrolyte liquid is a molten salt that does not evaporate or decompose when heated under vacuum.

In the above-mentioned embodiment, argon gas is injected in the gas charging step, but it is also possible to charge an inert gas such as nitrogen. Moreover, in cases where a lithium-containing compound is used as the molten salt, it is preferable to use argon gas rather than nitrogen gas in view of reactivity with lithium.

In the above-mentioned embodiment, the battery container 40 is charged with an inert gas such as argon gas and then sealed, but it is also possible to seal the battery container 40 while under vacuum. In this case, because the battery container needs to be able to withstand the difference in pressure between atmospheric pressure and the vacuum, the thickness of the battery container 40 walls should be increased.

In the above-mentioned embodiment, the check valve 50 functions as a safety valve for allowing gases generated inside the molten salt battery 1 to escape, and also functions as a gas discharge port for allowing moisture-containing gases inside the battery container 40 to escape during the production process. If providing these two functions, it is possible to use the following constitution instead of the check valve 50. For example, instead of a safety valve, it is possible to form a thin part that opens at a prescribed pressure by reducing the thickness of one part of the closing lid 42. In addition, instead of a gas discharge port, it is possible to form a gas discharge pipe in the closing lid 42. The opening in the gas discharge pipe is closed by welding after the battery container 40 is heated under vacuum and the argon gas is injected. In cases where gases are not generated inside the molten salt battery 1, the thin part may be omitted.

In the above-mentioned embodiment, an aluminum non-woven fabric is used as the current collector, but it is also possible to use an aluminum porous body, an aluminum foil, and the like. In addition, the current collector may be formed from a corrosion-resistant material such as gold or platinum.

EXAMPLES

The above-mentioned embodiment will now be explained in greater detail through the use of examples and comparative examples. However, the scope of the present invention is not limited to the examples.

Figure 2:
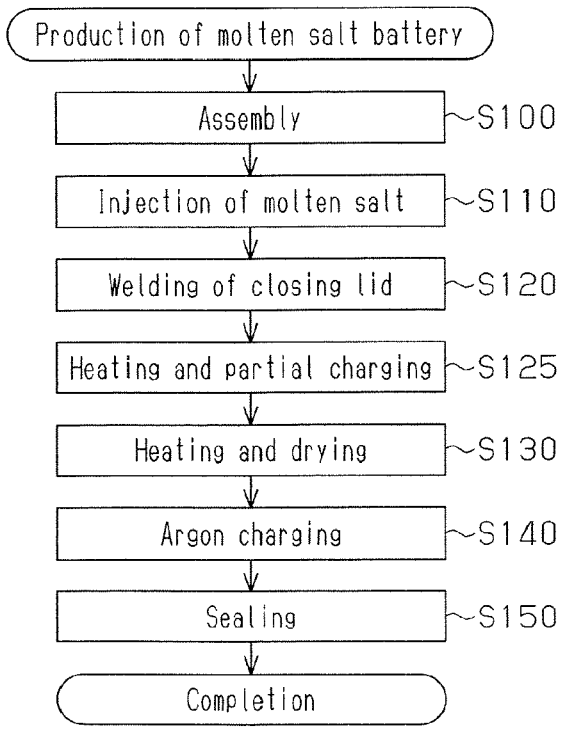
FIG. 2 is a flow chart showing a production process of a molten salt battery.

The molten salt batteries of the examples were produced according to the method shown in FIG. 2 and FIG. 3. In addition, the molten salt batteries of the comparative examples were produced using a conventional method. In addition, both types of molten salt battery were compared and investigated in terms of molten salt battery characteristics.

$NaCrO_2$ was used as the positive electrode, a Sn—Na alloy was used as the negative electrode, and a glass cloth having a thickness of 200 μm was used as the separator. A mixed salt of NaFSA and KFSA at a molar ratio of 56:44 was used as the molten salt electrolyte. Using these materials, the molten salt battery shown in FIG. 1 was produced as follows. Specifically, the molten salt batteries of the examples were produced using the present invention production method shown in FIG. 2. In addition, the molten salt batteries of the comparative examples were produced using a conventional production method, in which the positive electrode 10, the negative electrode 20 and separator 30 were heated and dried and then assembled in the battery container 40, and the molten salt was then injected.

As the molten salt batteries of the examples, a variety of molten salt batteries were produced by altering the heating temperature of the battery container 40, the pressure inside the chamber 110 and the period for which the heated vacuum state was maintained in the heating and drying step (S130) and the heating temperature and charging conditions in the heating and partial charging step (S125) that was carried out before the heating and drying step. In addition, before the various molten salt batteries were sealed, the water content in the molten salt electrolyte was measured using the Karl Fischer method. In this way, the relationship between the water content in the molten salt electrolyte and the molten salt battery production method and production conditions was investigated.

Measured values for the water content in the molten salt electrolyte varied according to the production history of the molten salt batteries. Of these, the following findings relating to molten salt battery performance were obtained. One was that it is important to reduce the water content in the molten salt electrolyte to an extremely low level in order to maintain good charging and discharging cycle characteristics, and another was that by using the method of the present invention rather than a conventional method, it is possible to greatly reduce the water content in the molten salt electrolyte.

Figure 4:
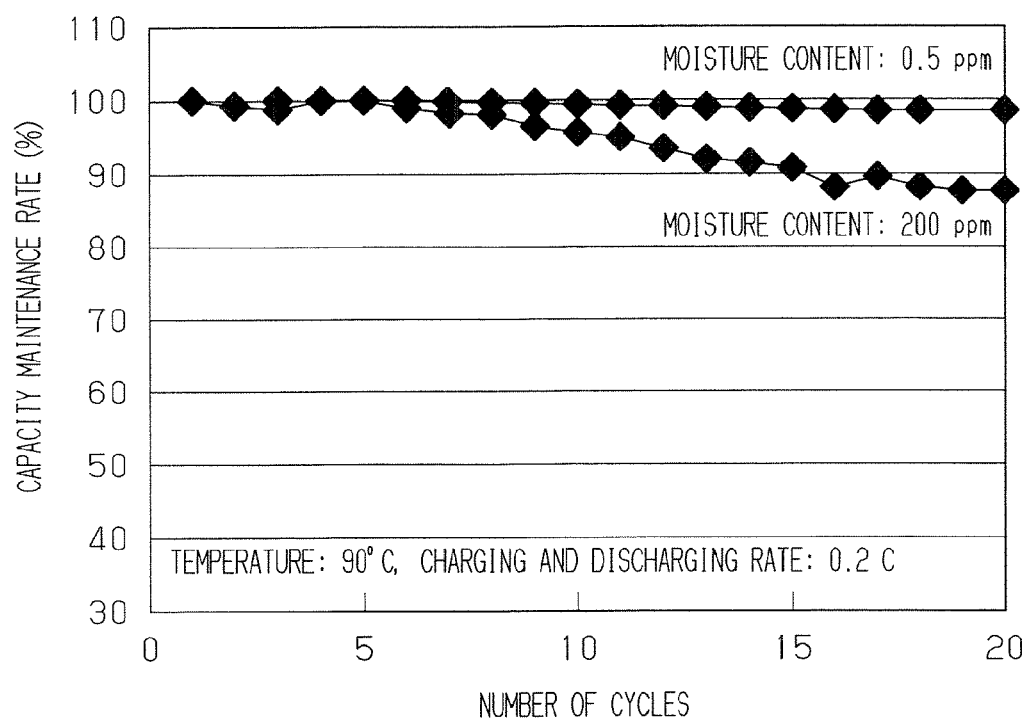
FIG. 4 is a graph showing the relationship between the initial cycle characteristics and the moisture content in a molten salt charged in a molten salt battery according to one embodiment of the present invention.

As an example of the above-mentioned results, FIG. 4 shows the relationship between the water content in the molten salt electrolyte and the discharging capacity of a battery after the initial charging and discharging cycles (the first 20 cycles). This performance evaluation was carried out at a temperature of 90° C. and a charging and discharging rate of 0.2 C. Moreover, in FIG. 4, the measurement data for a water content of 0.5 ppm corresponds to the molten salt battery of the present invention, and the measurement data for a water content of 200 ppm corresponds to a molten salt battery produced using a conventional method. As shown in FIG. 4, a molten salt battery having a water content of 200 ppm undergoes a significant decrease in battery capacity after the initial cycles, and cannot therefore be used for a long period of time. Conversely, a molten salt battery having a water content of 0.5 ppm maintains a relatively stable discharging capacity even after the initial cycles, and can therefore be used for a long period of time.

The invention claimed is:

1. A method for producing a molten salt battery, the method comprising:
    a housing step of housing a positive electrode, a negative electrode and a separator in a battery container;
    an injecting step of injecting a molten salt into the battery container;
    a closing step of closing the battery container with a closing lid provided with a gas discharge port;
    a heating and drying step of housing the battery container in a chamber, with the gas discharge port open, and heating the battery container under vacuum in the chamber; and
    a sealing step of closing the gas discharge port, wherein:
    the molten salt contains an anion represented by $N(SO_2—R1)(SO_2—R2)$ (R1 and R2 are each independently a fluorine atom or a fluoroalkyl group) and a cation of at least one of an alkali metal and an alkaline earth metal, and
    in the heating and drying step, the molten salt is heated to a temperature that is not lower than the melting point of the molten salt and not higher than the temperature at which the molten salt decomposes.

2. The method for producing a molten salt battery according to claim 1, further comprising a heating and partial charging step before carrying out the heating and drying step in which the battery container is heated.

3. The method for producing a molten salt battery according to claim 1, wherein the molten salt contains an anion represented by $N(SO_2—R1)(SO_2-R2)$ (R1 and R2 are each independently a fluorine atom or a fluoroalkyl group) and, as cations, a sodium ion and at least one type of cation selected from among a quaternary ammonium ion, an imidazolium ion, an imidazolinium ion, a pyridinium ion, a pyrrolidinium ion, a piperidinium ion, a morpholinium ion, a phosphonium ion, a piperazinium ion and a sulfonium ion.

4. The method for producing a molten salt battery according to claim 1, wherein the battery container is charged with an inert gas via the gas discharge port after the heating and drying step.

5. The method for producing a molten salt battery according to claim 4, wherein the water content in the inert gas is 10 ppm or lower.

6. The method for producing a molten salt battery according to claim 1, wherein the water content in the battery container is 200 ppm or lower.

7. The method for producing a molten salt battery according to claim 6, wherein the water content in the molten salt in the battery container is 200 ppm or lower.

8. The method for producing a molten salt battery according to claim 1, wherein the closing lid is provided with a check valve having a vent hole as the gas discharge port.

9. The method for producing a molten salt battery according to claim 1, wherein the closing lid is provided with an outlet that is a gas discharge port and a gas exhaust pipe having a closable pipeline.

10. A molten salt battery produced using the method for producing a molten salt battery according to claim 1.

* * * * *